United States Patent
Denton et al.

(10) Patent No.: US 11,669,561 B2
(45) Date of Patent: Jun. 6, 2023

(54) CONTENT SHARING PLATFORM PROFILE GENERATION

(71) Applicant: Snap Inc., Santa Monica, CA (US)

(72) Inventors: Trevor Denton, Santa Monica, CA (US); Kirk Ouimet, Orem, UT (US); Chamal Samaranayake, Venice, CA (US); Jeremy Voss, Los Angeles, CA (US); Haibo Zhao, Redondo Beach, CA (US); Zhuangtian Zhao, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/718,652

(22) Filed: Apr. 12, 2022

(65) Prior Publication Data
US 2022/0237223 A1    Jul. 28, 2022

Related U.S. Application Data

(63) Continuation of application No. 16/918,543, filed on Jul. 1, 2020, now Pat. No. 11,334,614, which is a
(Continued)

(51) Int. Cl.
*G06F 16/435* (2019.01)
*G06F 16/28* (2019.01)
*H04L 67/50* (2022.01)

(52) U.S. Cl.
CPC .......... *G06F 16/437* (2019.01); *G06F 16/288* (2019.01); *H04L 67/535* (2022.05)

(58) Field of Classification Search
CPC ... G06F 16/437; G06F 16/288; H04L 67/535; H04L 67/306; G06Q 50/01; G06Q 50/10
See application file for complete search history.

(56) References Cited

U.S. PATENT DOCUMENTS 10,476,968 B2 * 11/2019 Venolia ............... G06Q 10/06
10,762,121 B2    9/2020 Denton et al.
(Continued)

FOREIGN PATENT DOCUMENTS

CN        112313688 A     2/2021
KR       20170120477    10/2017
(Continued)

OTHER PUBLICATIONS

U.S. Appl. No. 16/022,520 U.S. Pat. No. 10,762,121, filed Jun. 28, 2018, Content Sharing Platform Profile Generation.
(Continued)

*Primary Examiner* — Cheikh T Ndiaye
(74) *Attorney, Agent, or Firm* — Schwegman Lundberg & Woessner, P.A.

(57) ABSTRACT

Systems and methods are provided receiving, from a computing device associated with a first user of a content sharing platform, a request to access a second user profile associated with a second user in the content sharing platform, accessing activity data related to both the first user and the second user in the content sharing platform, determining common activity data to both the first user and the second user, wherein the common activity data comprises at least one media content item generated by the second user that was viewed or saved by the first user, or one or more datum saved by the first user from a communication received from the second user, and generating second user profile data comprising the common activity data related to both the first user and the second user in the content sharing platform as part of the second user profile.

20 Claims, 21 Drawing Sheets

Related U.S. Application Data continuation of application No. 16/022,520, filed on Jun. 28, 2018, now Pat. No. 10,762,121.

(56) References Cited

U.S. PATENT DOCUMENTS

| | | | |
|---|---|---|---|
| 2011/0066949 A1* | 3/2011 | DeLuca | G06Q 10/10 715/744 |
| 2012/0150970 A1* | 6/2012 | Peterson | H04L 65/401 715/810 |
| 2012/0271883 A1 | 10/2012 | Montoya et al. | |
| 2013/0159883 A1* | 6/2013 | Yerli | G06Q 30/02 715/753 |
| 2014/0019533 A1* | 1/2014 | Sherman | G06Q 10/10 709/204 |
| 2014/0019540 A1 | 1/2014 | Shin et al. | |
| 2014/0067958 A1* | 3/2014 | Bradley | H04L 67/306 709/204 |
| 2014/0310337 A1* | 10/2014 | Kim | G06Q 10/10 709/203 |
| 2015/0058380 A1* | 2/2015 | Polonsky | G06F 16/252 707/812 |
| 2017/0257445 A1 | 9/2017 | Baldwin et al. | |
| 2020/0004829 A1 | 1/2020 | Denton et al. | |
| 2020/0334284 A1 | 10/2020 | Denton et al. | |

FOREIGN PATENT DOCUMENTS

| | | | | |
|---|---|---|---|---|
| WO | WO-2017137952 A1 * | 8/2017 | | G06F 15/16 |
| WO | WO-2020006245 A1 | 1/2020 | | |

OTHER PUBLICATIONS

U.S. Appl. No. 16/918,543, filed Jul. 1, 2020, Content Sharing Platform Profile Generation.
"U.S. Appl. No. 16/022,520, Non Final Office Action dated Dec. 30, 2019", 9 pgs.
"U.S. Appl. No. 16/022,520, Notice of Allowance dated Apr. 17, 2020", 8 pgs.
"U.S. Appl. No. 16/022,520, Response filed Mar. 12, 2020 to Non Final Office Action dated Dec. 30, 2019", 12 pgs.
"U.S. Appl. No. 16/918,543, Non Final Office Action dated Jul. 9, 2021", 11 pgs.
"U.S. Appl. No. 16/918,543, Notice of Allowance dated Jan. 14, 2022", 5 pgs.
"U.S. Appl. No. 16/918,543, Response filed Sep. 17, 2021 to Non Final Office Action dated Jul. 9, 2021", 9 pgs.
"International Application Serial No. PCT/US2019/039526, International Preliminary Report on Patentability dated Jan. 7, 2021", 8 pgs.
"International Application Serial No. PCT/US2019/039526, International Search Report dated Oct. 25, 2019", 3 pgs.
"International Application Serial No. PCT/US2019/039526, Written Opinion dated Oct. 25, 2019", 6 pgs.
"Korean Application Serial No. 10-2021-7002400, Notice of Preliminary Rejection dated Jan. 11, 2023", w/ English Translation, 20 pgs.
"Kakao Launches Kakao Games Official Fan Group", w/ English Machine Translation, [Online] Retrieved from the Internet: <https://n.news.naver.com/mnews/article/I 09/0002793618?sid=105>, (Jun. 2014), 4 pgs.
"'Music and Skinship' Sending Love Through Social Media", w/ English Machine Translation, [Online] Retrieved from the internet: <https://n.news.naver.com/mnews/article/016/0000435971?sid=101>, (Nov. 2012), 7 pgs.

* cited by examiner

CONTENT SHARING PLATFORM PROFILE GENERATION

This application is a continuation of U.S. patent application Ser. No. 16/918,543, filed Jul. 1, 2020, which is a continuation of U.S. patent application Ser. No. 16/022,520, filed Jun. 28, 2018, which are incorporated herein by reference in their entireties.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. The users of the content sharing platform may comprise a variety of different demographics (e.g., age, gender, location), may have various preferences for content, may have various levels of social activity, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to generating and displaying profile data for users and publishers in a content sharing platform. Conventionally, profile information for a user may simply comprise limited information for a user, such as a name or image of the user. Example embodiments allow for dynamic creation of a profile design for a user, users associated with other users (e.g., friends), and publishers of content. Thus, instead of a static identity, example embodiments allow a profile to comprise relationship information, common activity between users in the content sharing platform (e.g., exchange of messages, access to shared media content items, content or data from a message or media content item, etc.), relationship type (e.g., best friend, acquaintance, mutual best friend, etc.), compatibility between users (e.g., based on astrology, horoscopes, common interests, etc.), common creative tools (e.g., media overlays), location or distance between users, groups in common, and so forth. Example embodiments may further inspire users to create media content items (e.g., images and video) by allowing highlighting of favorite media content items and making it easy to access more content from publishers. Example embodiment create a more efficient and effective system for communicating between computing devices and sharing messages and media content items.

For example, a user may request access to a second user profile via a first computing device. A server system (e.g., a profile generation system or messaging system) receives the request to access a second user profile in the content sharing platform. The server system accesses activity data related to both the first user and the second user in the content sharing platform and determines common activity data to both the first user and the second user. For example, the common activity data may comprise at least one media content item generated by the second user that was viewed or saved by the first user, or one or more datum saved by the first user from a communication received from the second user. The server system generates the second user profile data further comprising the common activity data related to both the first user and the second user in the content sharing platform as part of the second user profile, and causes display of the second user profile comprising the common activity data related to both the first user and the second user in the content sharing platform.

Figure 1:
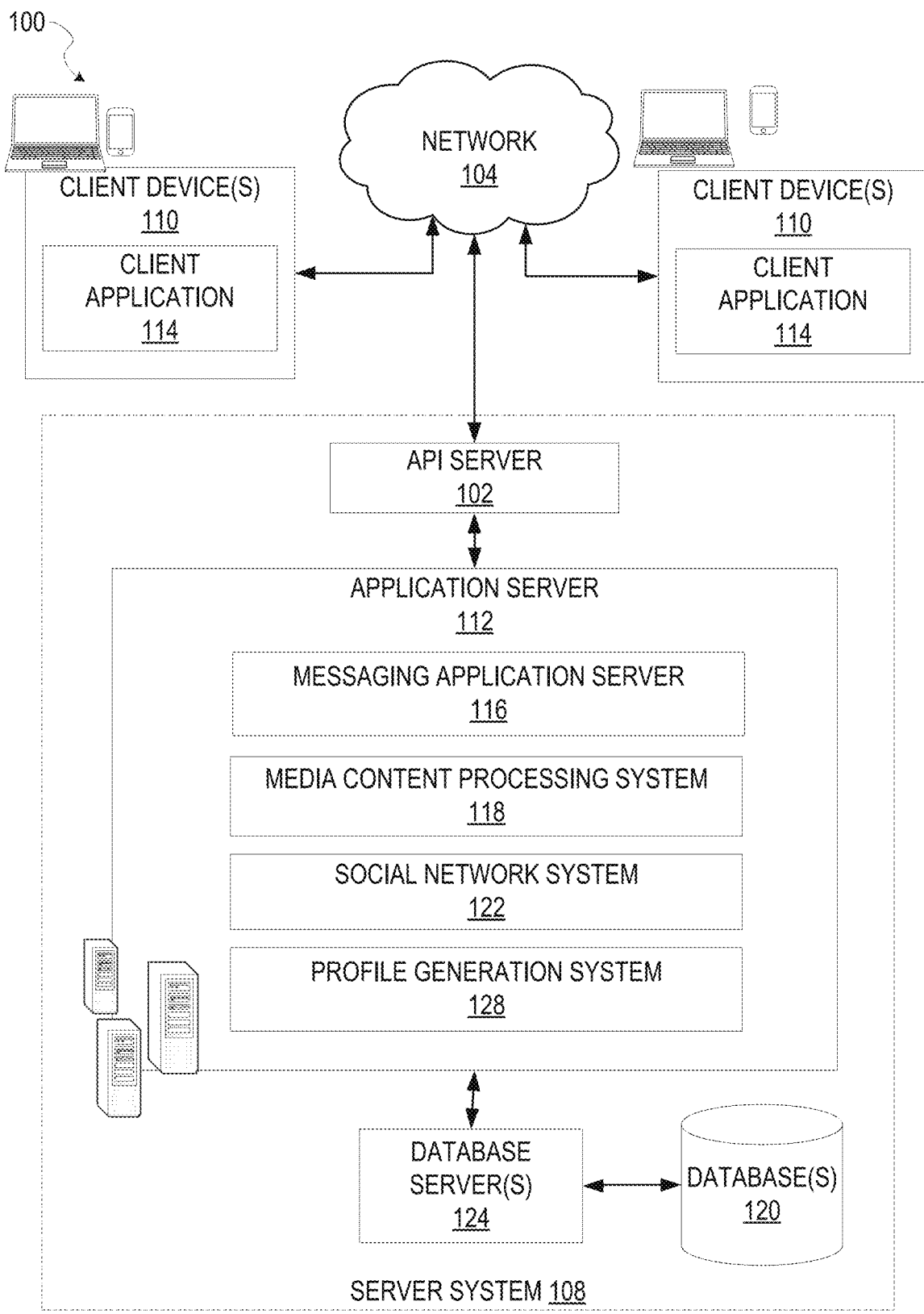
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. In one example, the networked system 100 is a content sharing platform.

The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections. The client device 110 may be a device of a user that is user to generate profile information for the user, profile information of other users associated with the user, and profile information of publishers of content.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third-party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide the user interface and at least some functionalities, with the client application 114 configured to communicate with other entities in the system 100 (e.g., third-party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, server system 108, etc.).

In one example, a client application 114 may be a messaging application (e.g., messaging client application 114 as referred to below) that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, a social network system 122, and a profile generation system 128, which may be communicatively coupled with each other and with one or more data storage(s), such as database(s) 120.

The server system 108 may be a cloud-computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, user profile data, publisher profile data, and so forth. The one or more databases 120 may further store information related to third-party servers, third-party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party application(s). The one or more third-party application(s), executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and user data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, the social network system 122, and the profile generation system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

The profile generation system 128 supports various functionality related to generating and updating profile information for users and publishers, as described in further detail below.

Figure 2:
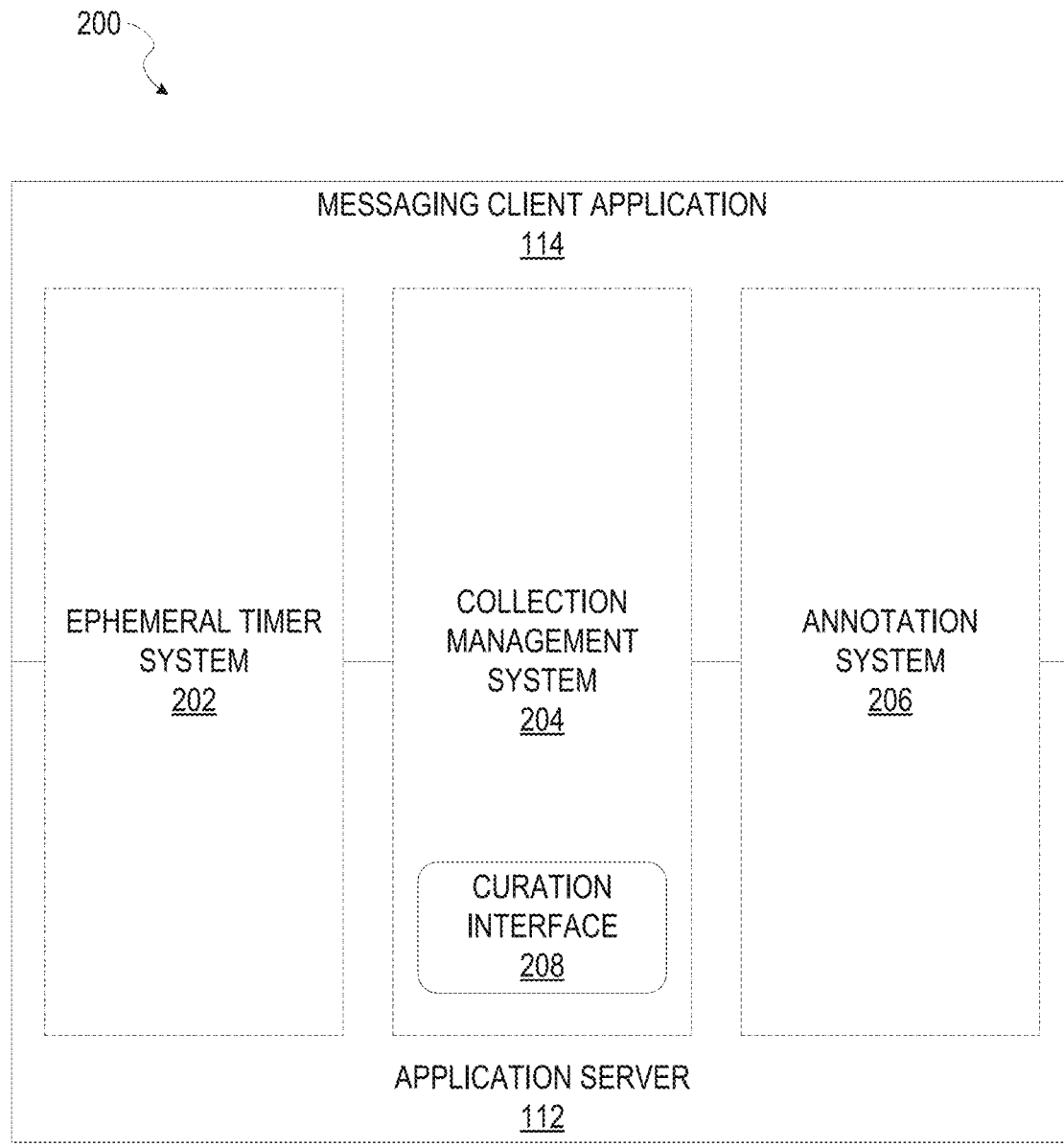
FIG. 2 is a block diagram illustrating further details regarding the messaging system, according to some example embodiments.

FIG. 2 is a block diagram 200 illustrating further details regarding the networked system 100, according to example embodiments. Specifically, the diagram 200 is shown to comprise a messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
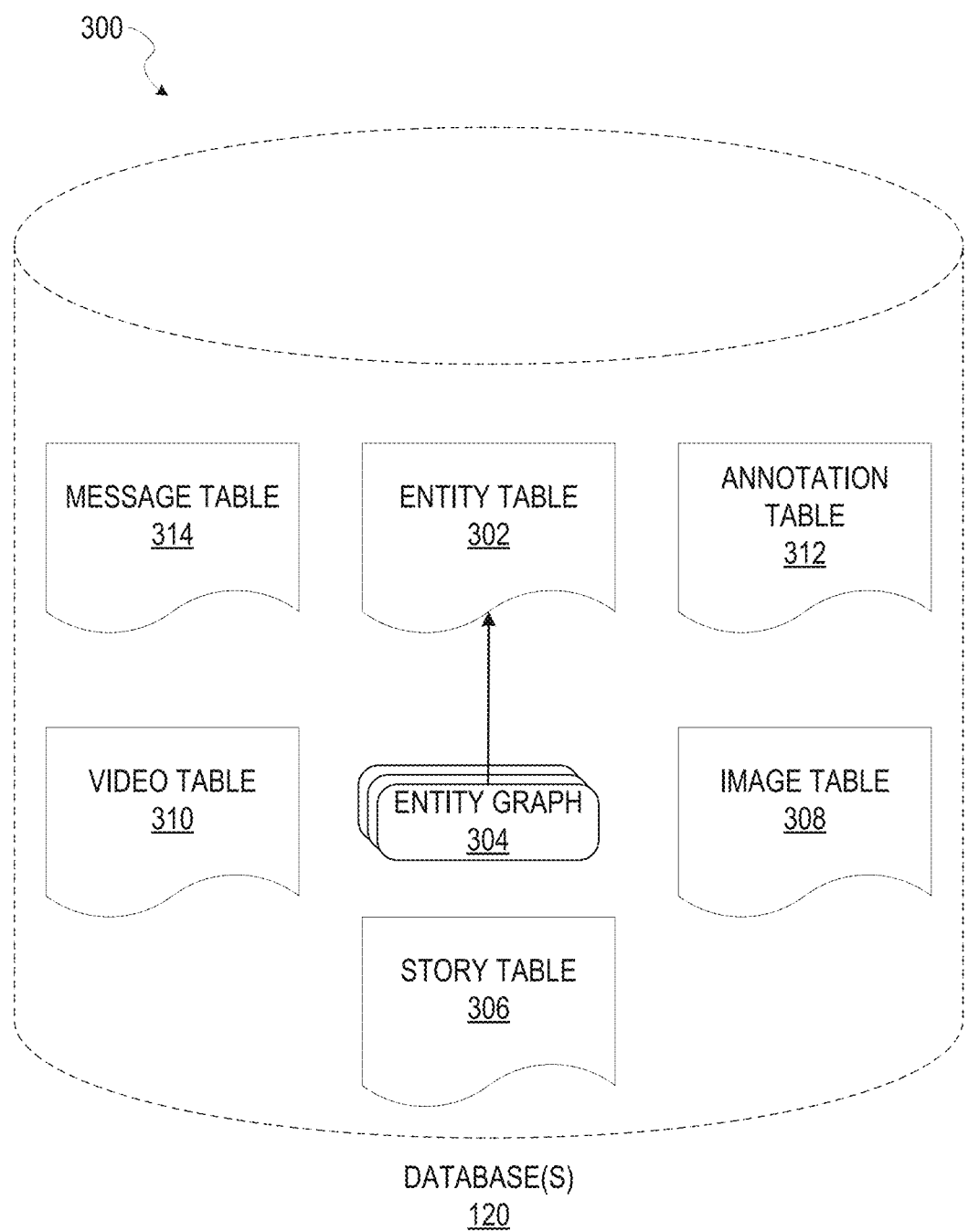
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
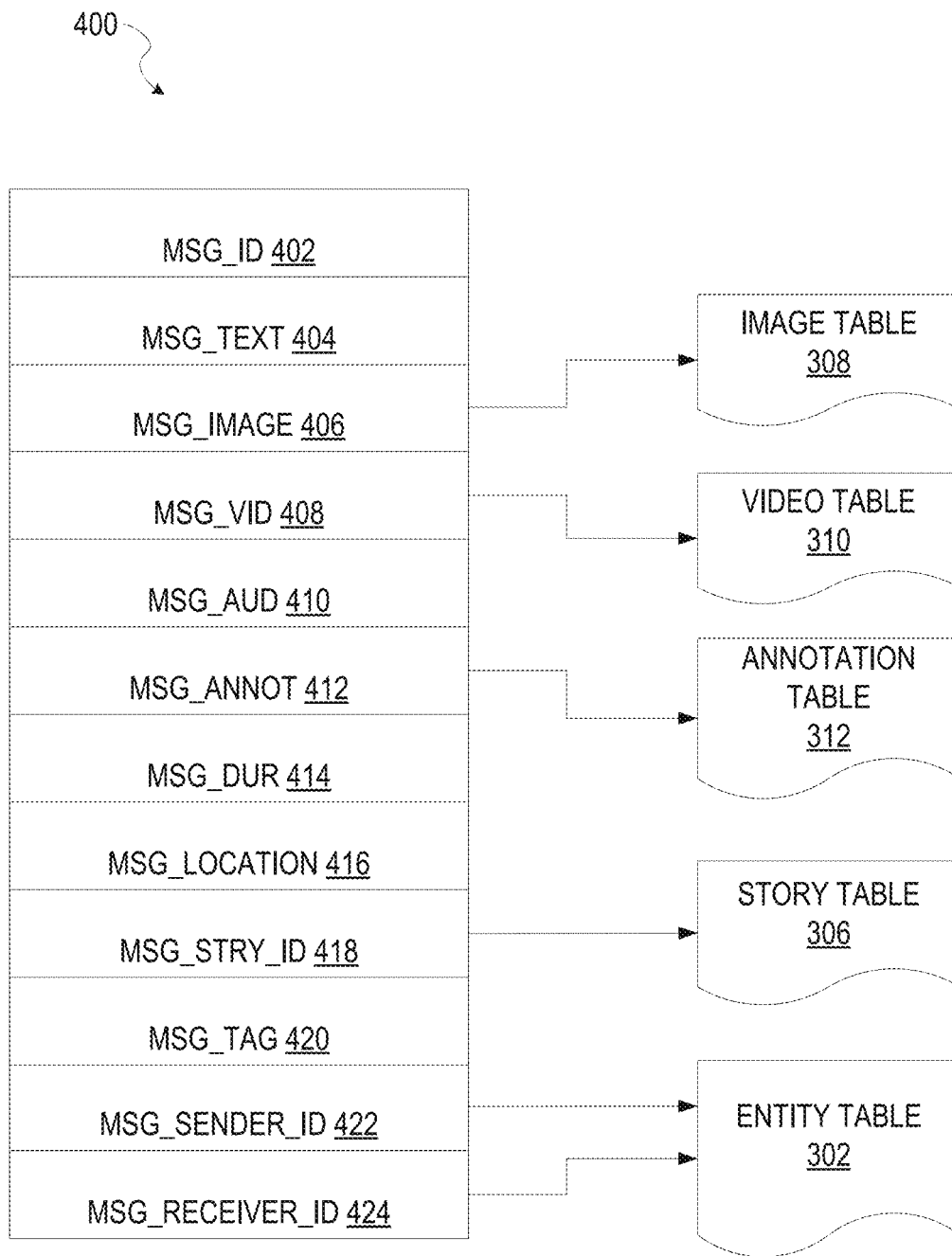
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to whom the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5A:
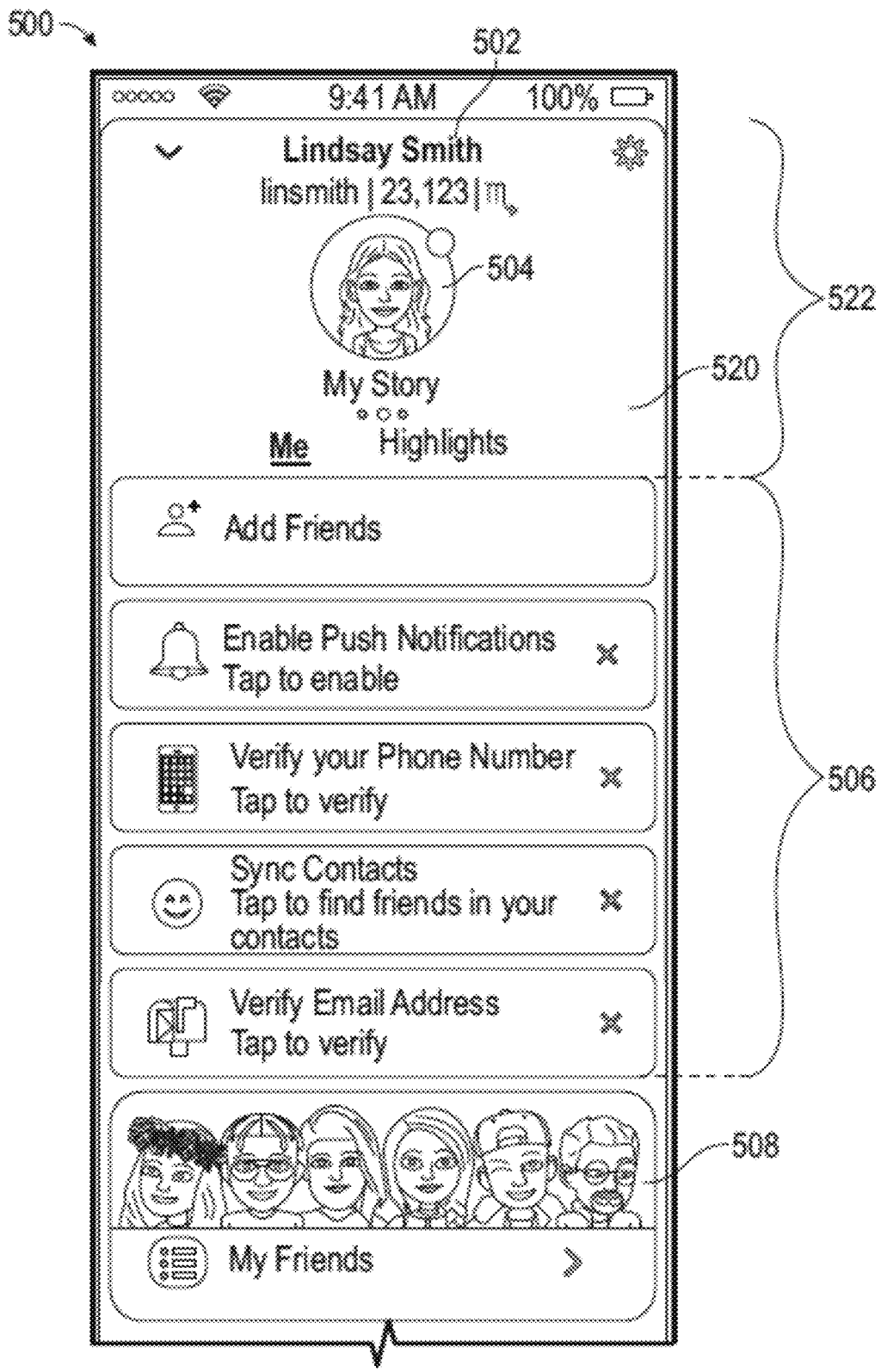
FIGS. 5A-5C illustrate example graphical user interfaces, according to some example embodiments.
Figure 5B:
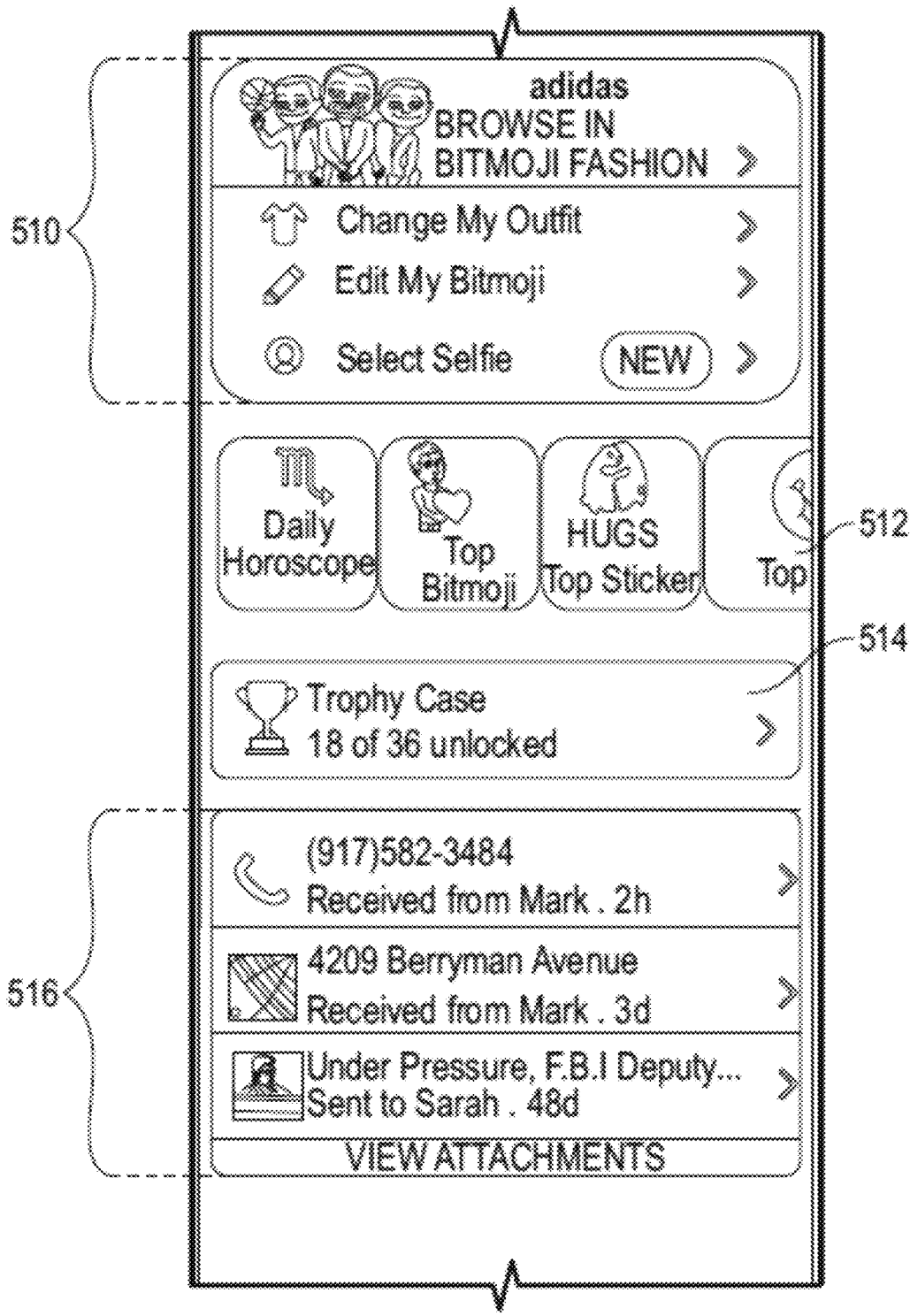
Figure 5C:
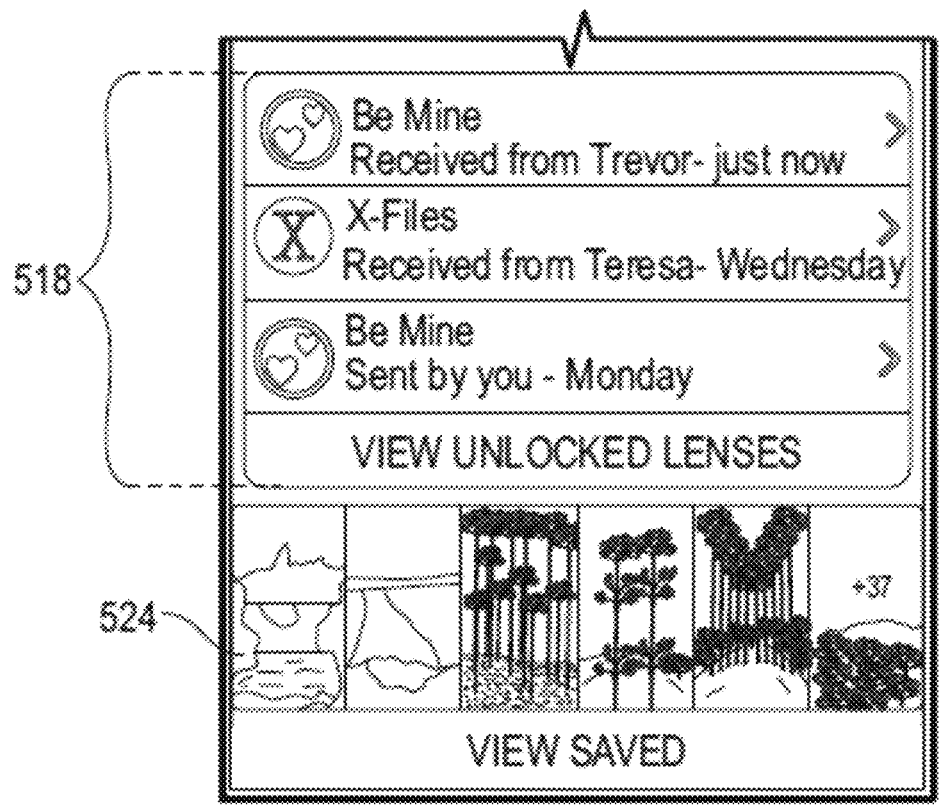

As explained above, example embodiments allow for dynamic creation of a profile design for a user, users associated with other users (e.g., friends), and publishers of content. For example, a user may create a profile in a content sharing platform, such as the example profile 500 displayed on a display of computing device and shown in FIGS. 5A-5C (broken into three parts to fit on each page). In this example, a user may use a computing device (e.g., mobile device) to request generation of a new profile (e.g., via a content sharing platform or messaging application). The computing device may request information or display information that the user may provide to be included in the user profile 500 or may automatically generate a profile 500 for the user based on other data from other systems. The computing device may display information about the user, content sharing platform activity information for the user, information about users associated with the user, and so forth. For example, the information included and displayed in the profile 500 may include a user name 502 and an image or photo 504 for the user. The profile 500 may further include various options 506 to enhance the profile or experience, such as an option to add one or more friends, enable push notifications, verify a phone number, sync contacts, verify and email address, and so forth. The profile 500 may further include information about friends 508 (e.g., users associated with the users), such as images or photos associated with each friend, a list of friends, information about friends, access to one or more friend profiles, and the like.

The profile 500 may further comprise the ability to create a bitmoji 510 or other avatar and also have various data 512 associated with the user such as a daily horoscope for the user and various usage cards (e.g., functionality usage or user interactions in the content sharing platform) such as a top bitmoji, a top sticker or creative tool, #1 best friend, top face lens, top world lens, top font, top color, top geofilter, top emoji, top custom sticker, top location, favorite publisher, favorite show, and the like, as well as and other data. For example, a #1 best friend card may be displayed for the friend that the user interacted with the most (e.g., exchanged messages, shared media content items, etc.). A top face lens card or top world lens card may be displayed if the user has used at least one lens (or other creative tool) to augment a media content item and sent the media content item to another user or added it to a media collection. The top face lens or top world lens may be the most used lens by the user. A top font card may be displayed if a user has used a font tool on a media content item sent to another user or posted to a media collection, and a top color card may be displayed if the user has used a drawing tool on a media content item sent to another user or posted to a media collection. A top geofilter card may be displayed if a user has ever used a geofilter on a media content item sent to another user or posted to a media collection, a top sticker card or top custom sticker card may be displayed if a user ever used a sticker or customer sticker on a media content item sent to another user or posted to a media collection. A top bitmoji card or top emoji card may be used if a user has ever used a bitmoji sticker or emoji sticker on a media content item sent to another user or posted to a media collection. A top location card may be displayed based on the location where the user spends the most time. A favorite publisher card may be displayed based on the most viewed publisher content or favorite show.

The profile 500 may also have trophy case information 514. Trophy case information may comprise achievement information with a pictograph linked to a type of achievement fulfilled by a user. For example, in order to assess whether the achievement is fulfilled, the social messaging system may receive a message activity communication from a client device, access messaging activity from various databases, determine a messaging score associated with the achievement pictograph (e.g., trophy), determine whether the message activity communication dictates an adjustment of the message activity score, further determine the message activity score transgresses a first threshold activity score, and display the achievement pictograph, as further described in pending application Ser. No. 15/098,603, incorporated herein by reference.

The profile 500 may further have an option to include or create highlights such as favorite media content that the user has created.

The profile 500 may further include information or datum 516 saved by the user from other users, publishers, or other sources. For example, a friend may send the user a phone number, address, link (e.g., URL), attachment (e.g., via a message in the content sharing platform) and the user may save the phone number, address, link, attachment (e.g., image, video), and the like to his user profile 500. The datum 516 may be in order of most recently received or saved and allow easy access to the messages or datum all in one place. In one example, the datum may be an entire message or media content item or may be a portion of a message or media content item. For example, a message sent to the user from another user may contain a phone number or address within the message. The user may select a portion of the message (e.g., just the phone number, just the address, the phone number and address, etc.), or the whole message, and save it to his user profile.

The profile may also include creative tools 518 available to the user, such as unlocked lenses or other creative tools for augmenting media content items (e.g., photos or videos).

The profile 500 may further comprise saved media content items 524 that may be media content items created by the user.

Figure 6:
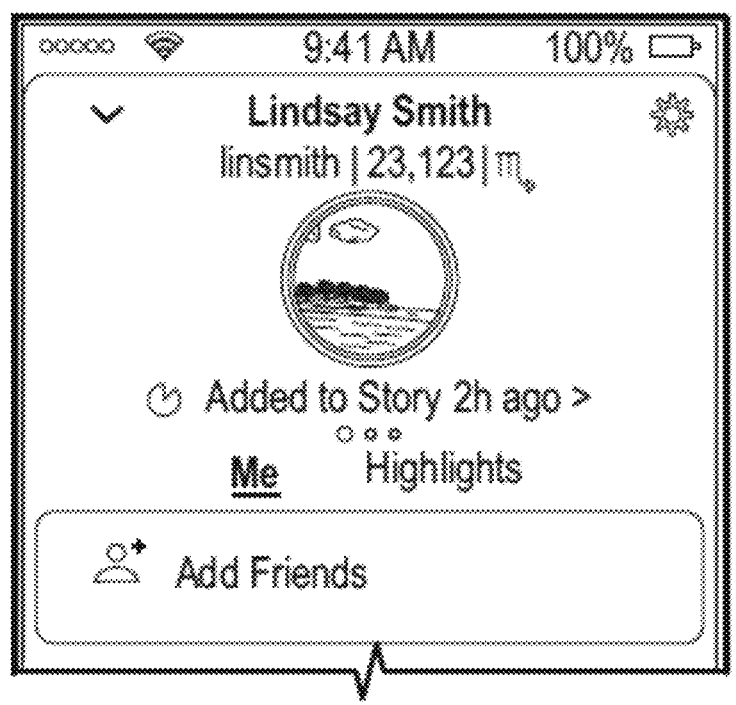
FIGS. 6-8 illustrate example graphical user interfaces, according to some example embodiments.
Figure 7:
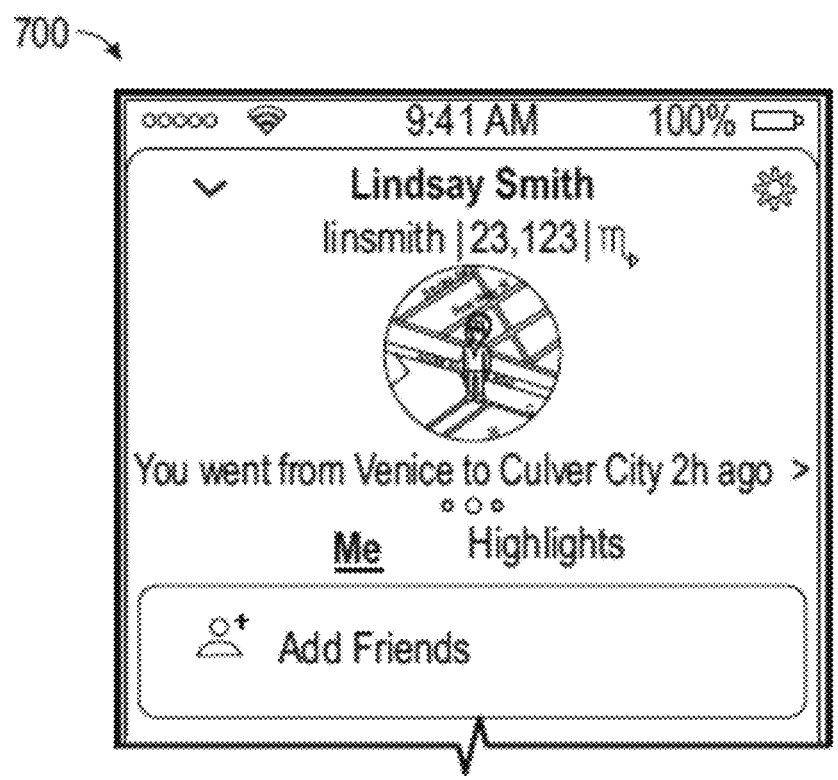
Figure 8:
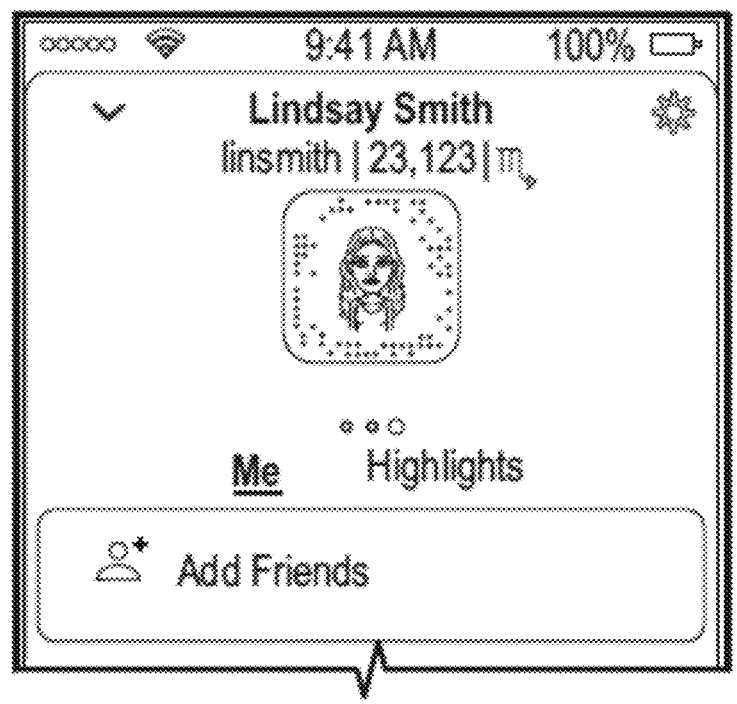

The profile 500 may further include an identity carousel 522 (FIG. 5A) which may have identity information for the user such as the user name 502 and the image or photo 504. The carousel 522 may further comprise information about an active media collection created by the user, as shown in the example profile 600 of FIG. 6, location or movement information as shown in the example profile 700 of FIG. 7, or a machine-readable optical label (e.g., a QR code, barcode, etc.) as shown in the example profile 800 of FIG. 8.

As described above, a user may have an option to add one or more friend via the profile displayed on the computing device. For example, the user may select an item in a graphical user interface to "add friends." This is just one example for adding one or more friends; it is understood that other methods to add one or more friends may be used with example embodiments. The computing device receives the request to create a relationship between the user (e.g., first user) and the friend (e.g., second user) of the content sharing planform. The request may comprise information about the friend, such as a name, email address, user name, or the like. The computing device may then associate the friend with the user. The friend information or association may be stored with profile data locally on the computing device and/or sent to a server system to be stored at the server system (e.g., via profile generation system 128). In another example, the request may be handled by the server system (e.g., server system 108) and the server system may receive the request and associate the friend with the user.

Figure 9:
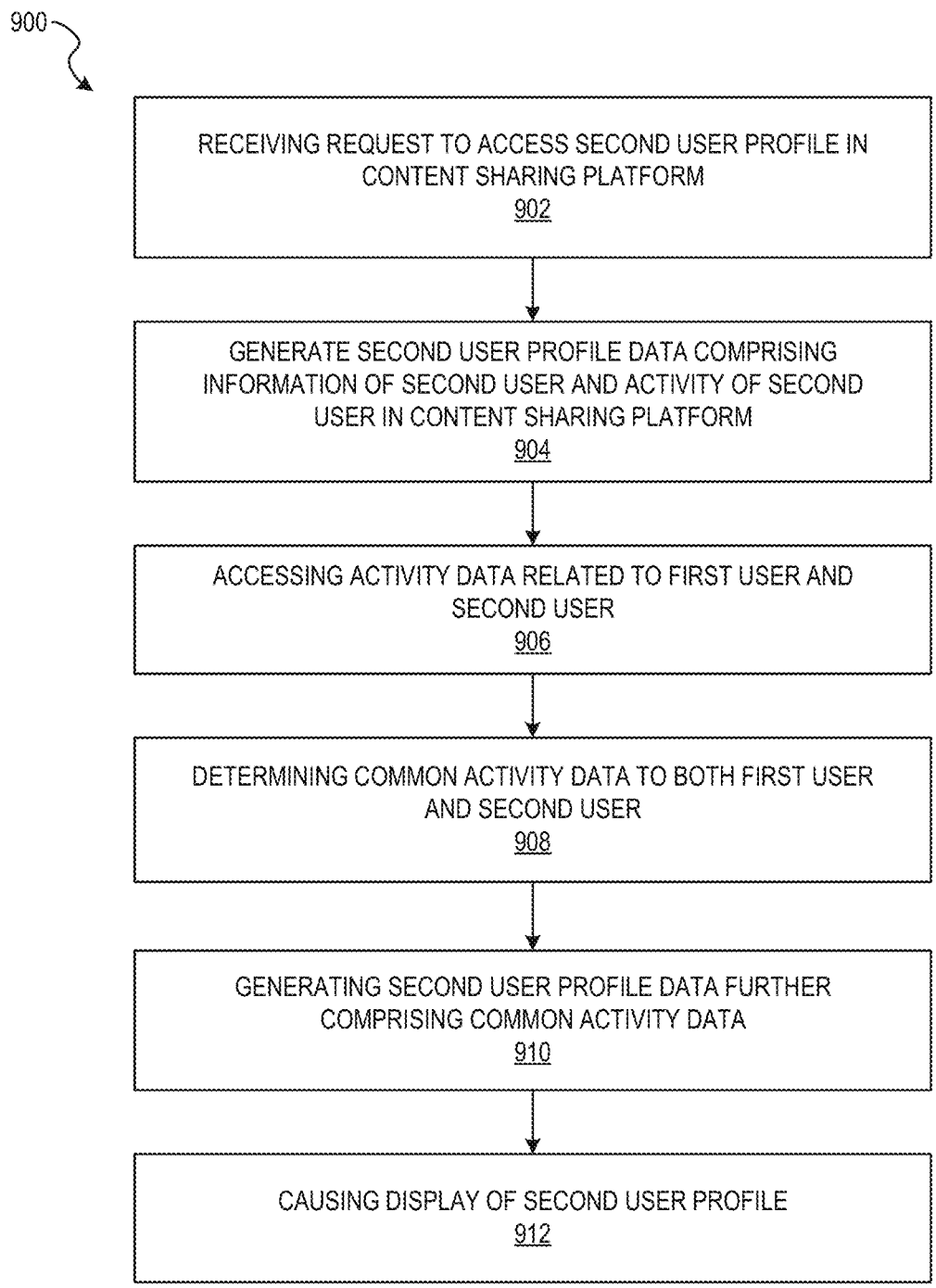
FIG. 9 is a flow chart illustrating aspects of a method, according to some example embodiments.

FIG. 9 is a flow chart illustrating aspects of a method 900 for generating user profile data, according to some example embodiments. For illustrative purposes, the method 900 is described with respect to the networked system 100 of FIG. 1. It is to be understood that the method 900 may be practiced with other system configurations in other embodiments.

In operation 902, a server system (e.g., server system 108 or profile generation system 128) receives, from a computing device associated with a first user of a content sharing platform, a request to access a second user profile in the content sharing platform. For example, the first user may interact with a display on the computing device to access and view the second user profile. The computing device may then send a request to access a second user profile to the server system to access and receive user profile data for the second user to generate the second user profile and display the second user profile on the computing device. In one example, the computing device may have some or all of the second user profile data stored locally on the computing device, and thus may only send a request to the server system to access and receive any updated second user profile data.

In one example, the computing device and/or the server system may determine that the first user is authorized to access the second user profile. For example, the computing device and/or the server system may determine that the first user is associated with the second user (e.g., they are "friends"), that the second user has authorized the first user to access the second user profile, and so forth. In another example, the computing device and/or server system may determine that the first user is not authorized to access the second user profile and deny or reject the request to access the second user profile.

In one example, the computing device may request (e.g., as part of the second user profile) all data for the second user profile, just new or updated data for the second user profile, just specific data (e.g., compatibility data, relationship data, location data, distance data, creative tools data, etc.), and so forth. The computing device may request the data in one request or in multiple requests.

In operation 904, the server system generates second user profile data. In one example, the server system generates user profile data comprising information associated with the second user and activity of the second user in the content sharing platform. In one example, the server system may access one or more databases 120 to determine information associated with the second user such as a user name, an image or photo associated with the user, any current media collections by the second user, location information for the user, groups of the user, and other information (e.g., similar to the information described above for profile display) associated with the user to be used to generate a display of the second user profile.

Also, the server system may access activity data of the second user. In one example, the server system may have a log comprising all the activity of the second user in the content sharing platform. For example, the server system may log when the second user interacts with another user, messages and media content items sent and received from other users, messages and media content items included in one or more media collections, second user access and viewing of publisher data, media collections, other user content, and other activity conducted within the content sharing platform. The server system may generate such a log for each user of the content sharing platform. The server system may access the log associated with the second user to determine information to include in the second user profile. For example, the server system may determine whether the second user has any current media collections and what time or date the second user last contributed messages or media content items to the media collection (e.g., "Added to Story 23m"), what messages or media content items the second user has saved (e.g., in total or in a predetermined time or date range), what attachments or other data the second user has saved from messages or other communications from other users, location changes, and so forth.

In operation 906, the server system accesses activity data for both the first user and the second user. As explained above, the server system may access the activity data in one or more databases 120. In operation 908, the server system determines activity data common to both the first user and the second user. For example, the server system may determine messages or media content items (e.g., images or videos) shared between the first user and the second user, messages or media content items generated by the second user and viewed and/or saved by the first user or vice versa, one or more datum saved by the first user from a communication received from the second user and vice versa, creative tools accessible to both the first user and the second user, creative tools that were accessed by the first user via the second user and vice versa, location information for the first user and the second user, and so forth.

In operation 910, the server system generates the second user profile data further comprising the common activity data related to both the first user and the second user in the content sharing platform, as part of the second user profile. For example, the server system may generate activity data comprising at least one media content item generated by the second user that was viewed or saved by the first user, one or more datum saved by the first user from a communication received from the second user, compatibility data, one or more relationship type for the first user and the second user, a distance between a location of a first user and a location of a second user (e.g., by determining first user location data and second user location data based on location of a computing device associated with each user or recent location data stored for each user, and determining the distance between the location of the first user and the location of the second user), creative tools accessible to both the first user and the second user (e.g., an indication of which creative tools are accessible to both the first user and the second user), a media collection generated by the second user and viewed and/or saved by the first user and vice versa, a message or media content item save by the first user from the media collection generated by the second user and vice versa, and so forth.

The server system may then send the generated second user profile data to the computing device associated with the first user. As explained above, the second user profile data may comprise all of the data for the second user profile data, a subset of the data (e.g., only updated data, specifically requested data (e.g., media content items from the second user saved by the first user), an indication that there is no new data from what was last sent, and so forth).

Figure 10A:
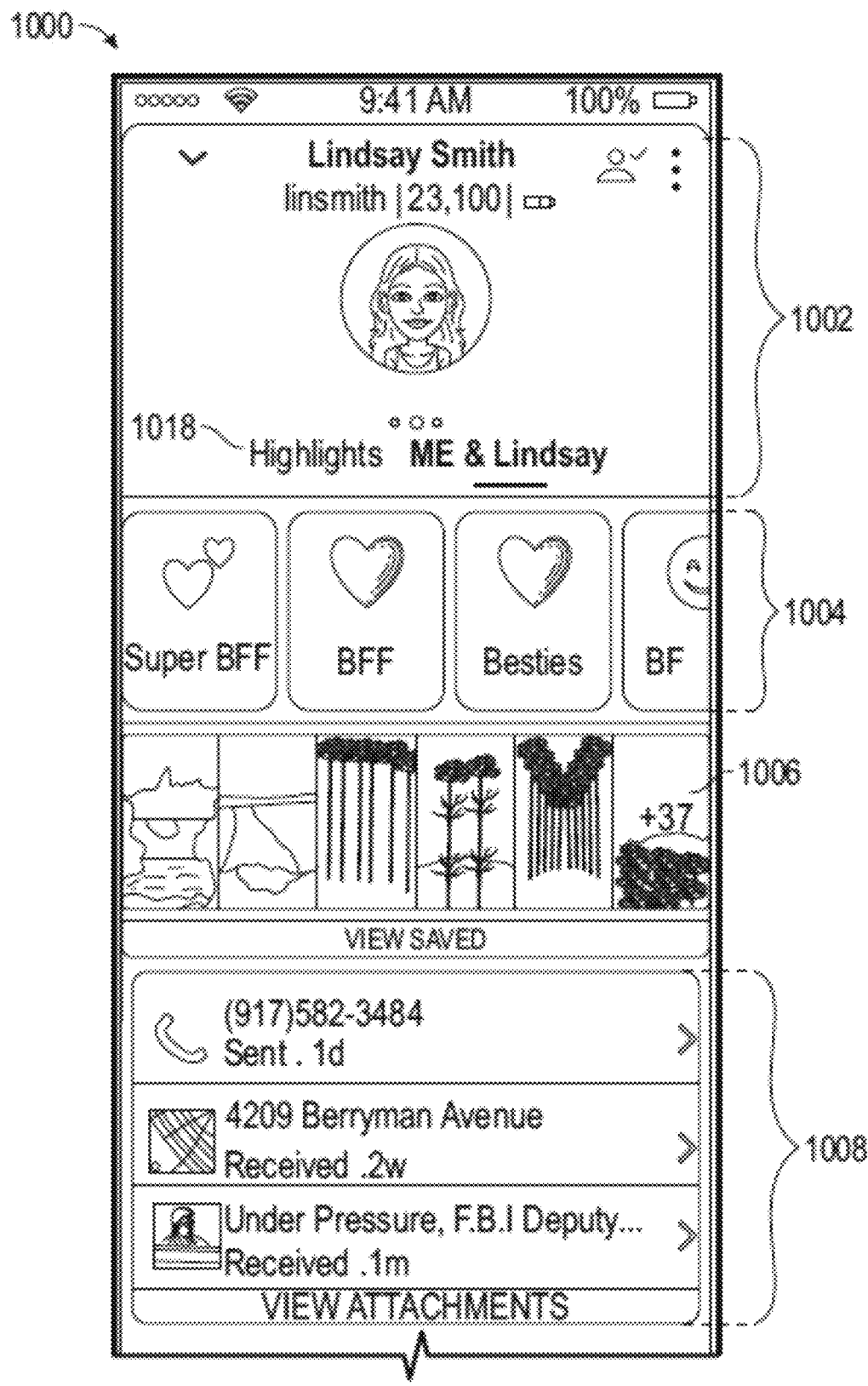
FIGS. 10A-10C illustrate example graphical user interfaces, according to some example embodiments.
Figure 10B:
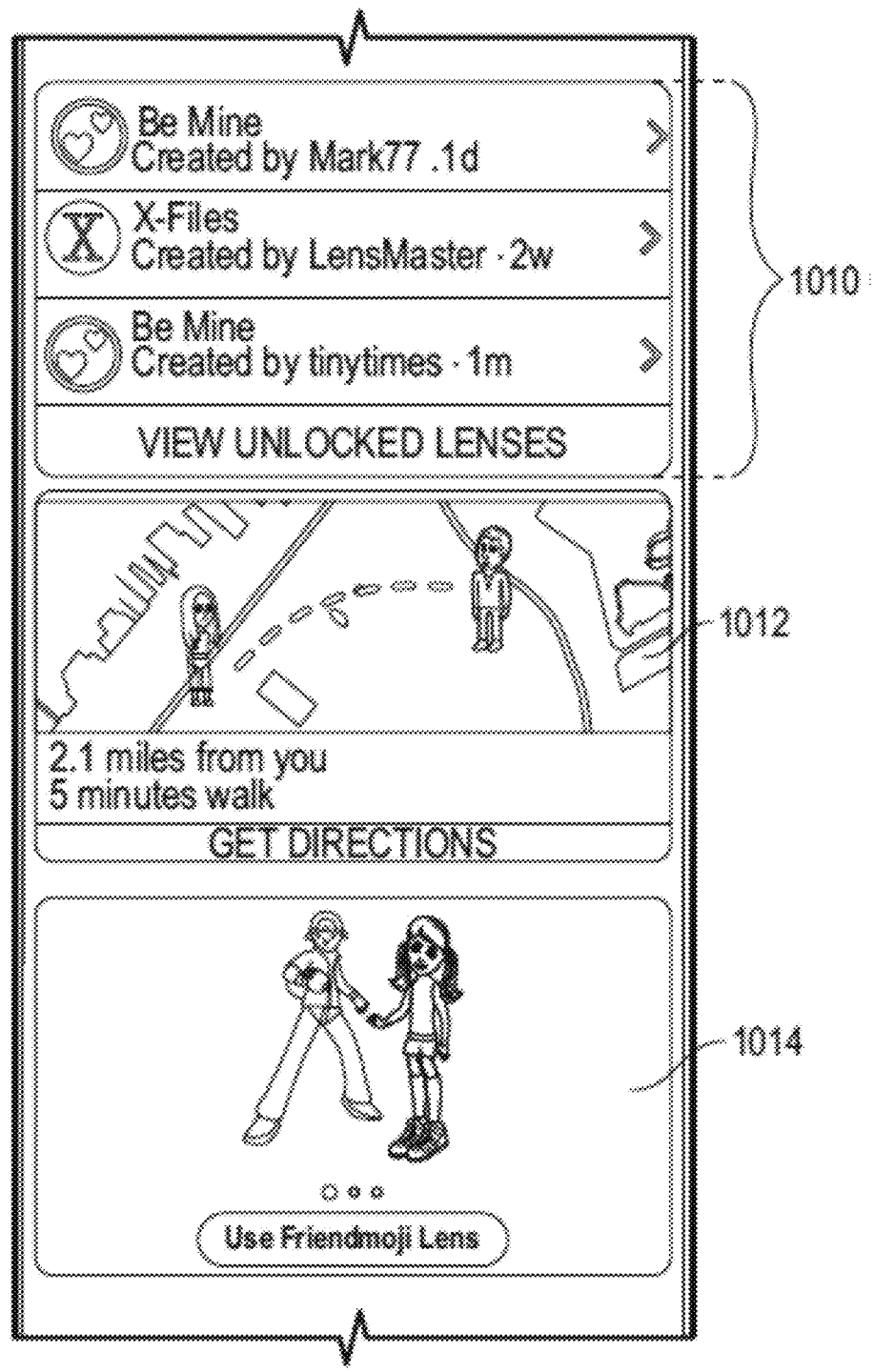
Figure 10C:
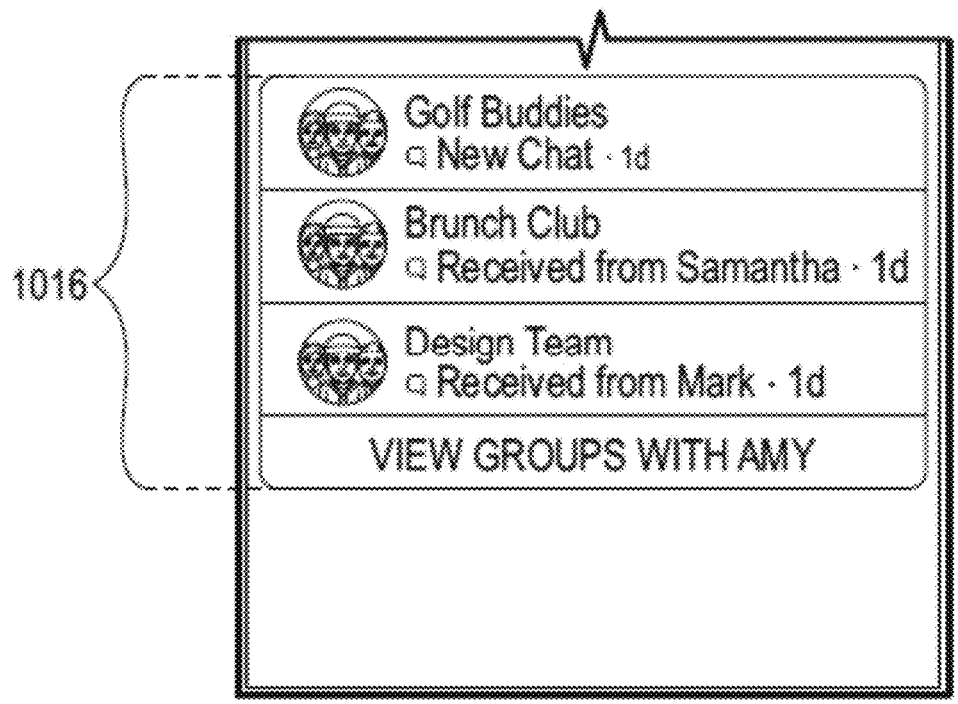

In operation 912, the server system causes the display of the second user profile on the computing device associated with the first user. For example, the computing device associated with the first user receives the second user profile data and generates a graphical user interface (GUI) comprising the second user profile data. An example second user profile 1000 displayed on a display of a computing device is shown in FIGS. 10A-10C (broken into three parts to fit on each page).

In one example, causing display of the second user profile further comprises causing an indicium to be generated indicating common activity related to both the first user and the second user in the content sharing platform, the indicium to be displayed on a display of the computing device associated with the first user, and causing the display of the common activity data comprising common activity related to both the first user and the second user in the content sharing platform as part of the second user profile based on receiving an indication that the first user interacted with the indicium indicating the common activity. In one example, the indicium "Me and Amy" may be displayed that the user may select to view common activity data for the user (e.g., "Me") and the second user (e.g., "Amy").

The example second user profile 1000 in FIG. 10 may include information 1002 about the second user, such as the name of the user, a user name for the user in the content sharing platform, and an image or photo for the user, and so forth. As explained above with respect to FIGS. 5A-5C, the information 1002 about the second user may be in the form of an identity carousel which may comprise the identity information (e.g., name of the user, user name, image or photo, etc.) and also information about an active media collection created by the user (e.g., a thumbnail of a media content in the media collection and a date/time when the second user made an addition to the media collection), location or movement information (e.g., an image of a map showing a location of the second user or that the second user just flew from Los Angeles to New York two hours ago, etc.), or a machine-readable optical label (e.g., a QR code, barcode, etc.) associated with the second user, and so forth. The identity information 1002 may further comprise an indication (e.g., icon, image, text) that the second user is a friend of the first user.

The example second user profile 1000 may further comprise one or more profile cards 1004. The profile cards 1004 may comprise cards indicating that the first user and the second user are super best friends (e.g., "Super BFF", which appears next to a user's number one best friend when the number one best friend also has the user as their number one best friend (e.g., for a predetermined period such as two months)), best friends (e.g., "BFF"), other form of relationship or friendships, such as "Besties", "BFs", "Their BF, but . . . ", "Mutual BFs", "Snapstreak", and other profile cards similar to those shown and described with respect to FIGS. 5A-5C (e.g., compatibility, top face lens, etc.). A compatibility profile card may show the second user's horoscope emoji or other astrological information. In one example, this feature allows a user to tap on the astrological sign emoji of and friend (or public) profile (who has the relevant information entered in their profile) and generate a compatibility chart with 10 different top aspects. For example, a user can view his compatibility chart with his friend (or public account) and then tap through their top 10 aspects together, swiping up on any for which that the user would like more detailed information. At the end, the user can swipe up to learn about more compatibility charts and the components of them (e.g., planets, aspects) and what they mean.

A top lens profile card (including a top world lens card) in the second user profile 1000 (e.g., friend profile), may be displayed if either the first user or the second user has sent at least one creative tool (e.g., lens) to the other directly or via a media collection. This could be creative tools sent to the other user within a predetermined time period (e.g., last two weeks). A top geofilter profile card may be displayed if either the first user or the second user has sent at least one message or media content item with a geofilter to the other user directly or via a media collection. A top bitmoji profile card or top friendmoji profile card may display the most used bitmoji or friendmoji. A top sticker profile card, top emoji sticker profile card, or top custom sticker profile card may be displayed if the first user and the second user have sent a sticker (e.g., one particular form of creative tool) to each other directly or via a media collection. A top location profile card may be displayed if the users have been in the same location with each other. This may be over a predetermined period of time (e.g., within the last month, two weeks, etc.).

A favorite publisher profile card may be displayed if the users have ever shared content or an edition from a publisher. A favorite show profile card may be displayed if the users have ever shared a show to each other. A favorite song profile card may be displayed if the users ever shared a song with each other (e.g., via the content sharing platform or via other method such as Shazam, Spotify, Apple Music, etc.).

The example second user profile 1000 may further comprise saved media content items 1006. The saved media content items 1006 may comprise and display all of the media content items that the users have saved from each other. The display may be in order of date that they were saved (e.g., in order from left to right, left being the most recent). A user may select a thumbnail of the media content item to view the media content item in a larger size (e.g., full screen).

The example second user profile 1000 may further comprise attachments 1008 comprising data exchanged between the first user, and/or data saved by the first or second user from messages, media content items, or other data exchanges between the users. In one example, only the most recent attachments may be displayed (e.g., most recent three attachments, attachments in the last day or week, etc.). Further indications may be included for each media content item, such as which user sent the attachment, which user saved the attachment, and the like. Attachments may include phone number, addresses, links (e.g., URL), user names, contact information (e.g., for a user or other person or business), songs, or other data included in message or media content item exchanged between the users.

The example second user profile 1000 may further comprise a list of creative tools 1010 (e.g., unlocked lenses) that may have been unlocked from each other. For example, a creative tool, such as a lens, may be locked unless a user meets certain criteria (e.g., is in a particular location, performs a particular action, etc.).

The example second user profile 1000 may further comprise a distance 1012 between the first user and the second user. In one example, the first user and the second user may be shown on a map in each of the user's respective locations and information about how far away they are and how long it would take to walk, bike, drive, fly, use public transit, and the like may also be calculated and displayed. A user may also be able to access functionality to get directions to the location of the other user.

The example second user profile 1000 may further comprise a friendmoji lens profile card 1014. The friendmoji lens profile card 1014 may comprise a friendmoji lens (e.g., creative tool) that may represent the first user and the second user and allow the first user and the second user to send the friendmoji to other users or apply the friendmoji to a media content item and send it to other users. There may be more than one friendmoji lens available for the first user and second user.

Figure 11:
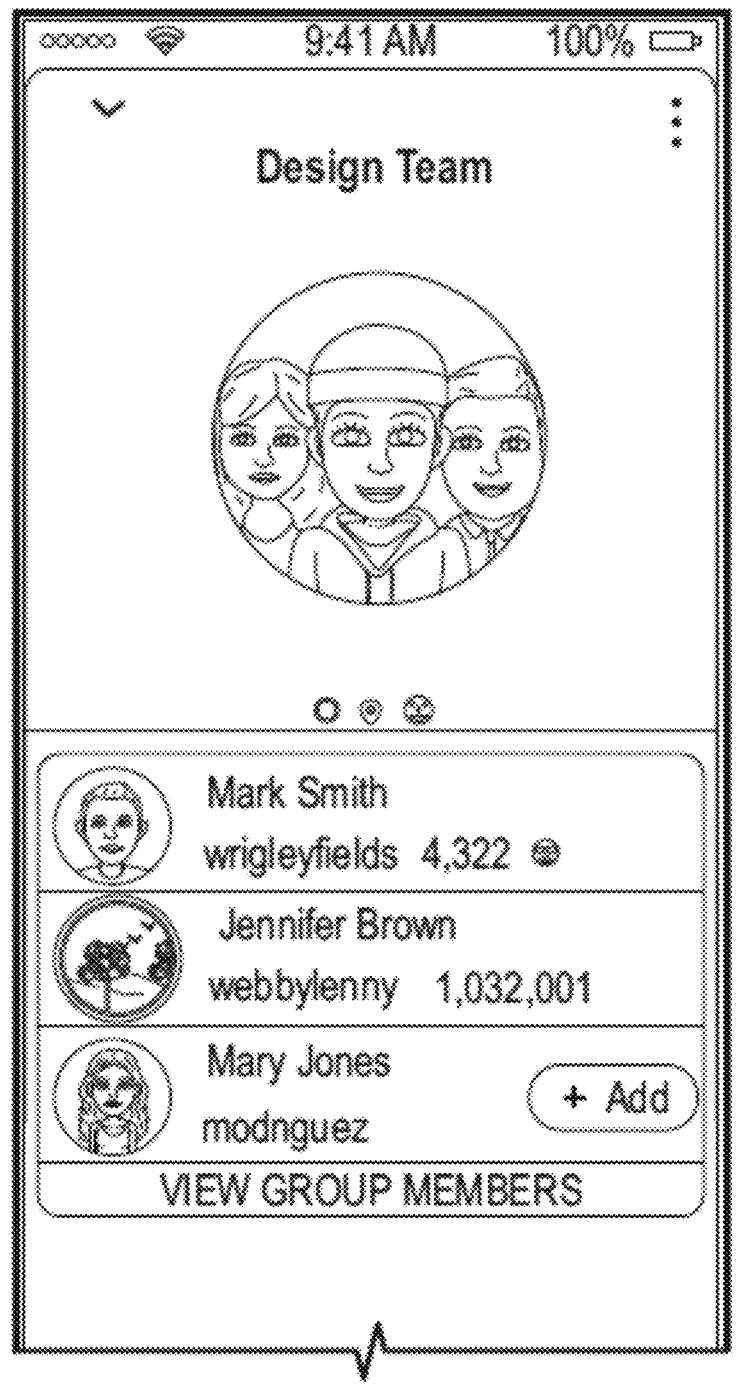
FIGS. 11-15 illustrate example graphical user interfaces, according to some example embodiments.

The example second user profile 1000 may further comprise a list of groups 1016 to which the first user and second user both belong. For example, the server system or computing device may determine which groups each user is a member of and which groups they have in common. In one example, each group may also have a profile, as shown in FIG. 11. The group profile may comprise a list of group members and the ability to access individual profiles for each group member. The group profile may further comprise identity information for the group comprising a group name, image or photo associated with the group (e.g., showing one or more of the group members) and other identity information similar to the identity information and carousal shown and described with respect to other profiles. The group profile may also comprise features and functionality similar to the features and functionality shown and described with respect to other profiles (e.g., location activity, profile cards, saved media content items, attachments, etc.). Likewise, the server system and/or computing device may generate the group profile similar to what is described herein with respect to other profiles.

Figure 12:
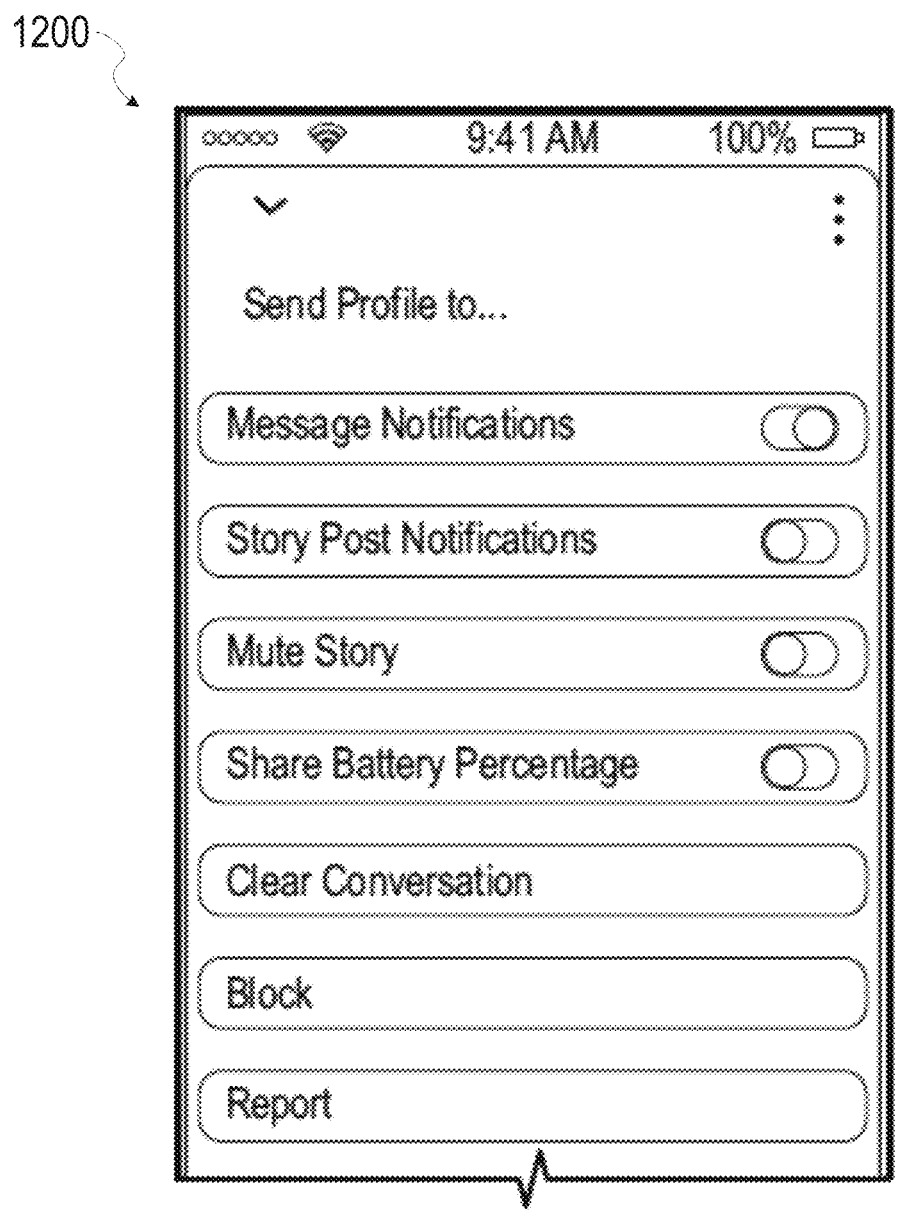

Returning to FIG. 10, the example second user profile 1000 may further comprise highlights 1018 where the second user may display favorite media content items, favorite media collections, favorite publishers, and so forth. The example second user profile 1000 may further comprise functionality to send the second user profile to another user, turn on and off notifications related to the second user or second user profile, mute a media collection (e.g., story), share a batter percentage, clear a conversation, block, report, and so forth, as shown in the example profile 1200 of FIG. 12.

Figure 13:
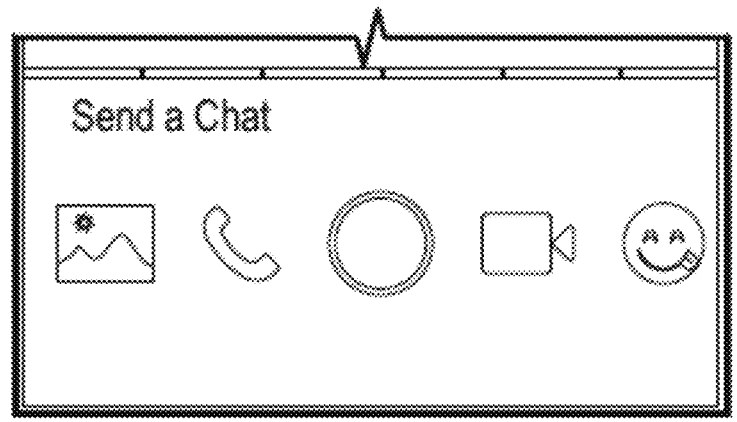

The example second user profile 1000 may further comprise functionality to allow the first user to communication with the second user, as shown in FIG. 13. For example, the first user may send a media content item, capture a media content item, call the second user, send an emoji, and so forth.

In some example embodiments a user may only access another user profile under certain conditions. For example, user A can only access the updates/activities user B chooses to share with his friends (e.g., user A is one friend), such as friend stories, maps explore updates, locations, and so forth. In another example user A can only access the saved media and attachments from user B in the conversation between A and B. In yet another example, user A can only access the saved media and attachments from user B in the same conversation group (e.g., the group may have members in additional to A and B). In another example, user A does not have access to user B's activities, such as when user B interacts with another user.

Figure 14:
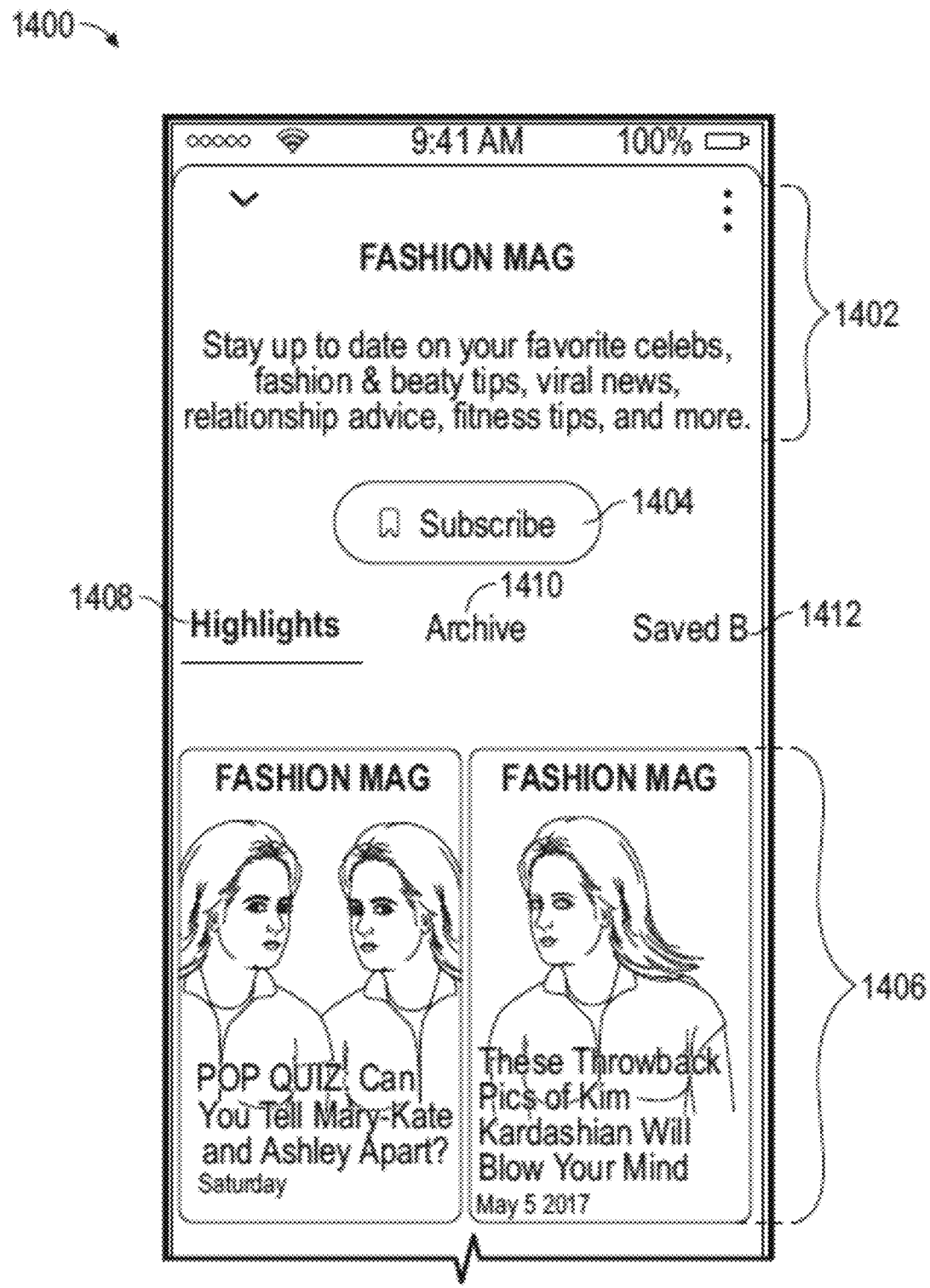

Some example embodiments may further comprise a publisher profile comprising information and content from publishers of content. A publisher of content may be a person or an entity, such as a celebrity, magazine publisher, news media publisher, and the like, that publishes content such as media collections, media content items, episodes of shows, and other content. FIG. 14 shows an example publisher profile 1400 comprising identity information 1402 for the publisher (e.g., publisher name and summary of type of content provided) and an option to subscribe 1404 to the publisher content. If a user has already subscribed to the publisher content, the option to subscribe 1404 would not be displayed. The publisher profile 1400 may further comprise images 1406 representing highlighted content 1408. Example embodiments allow a publisher to handpick and show favorite or highest quality content as highlights. The publisher profile 1400 may further comprise an option 1410 to view archived content and an option 1412 to view content saved by the user (e.g., favorite content saved by the user).

Figure 15:
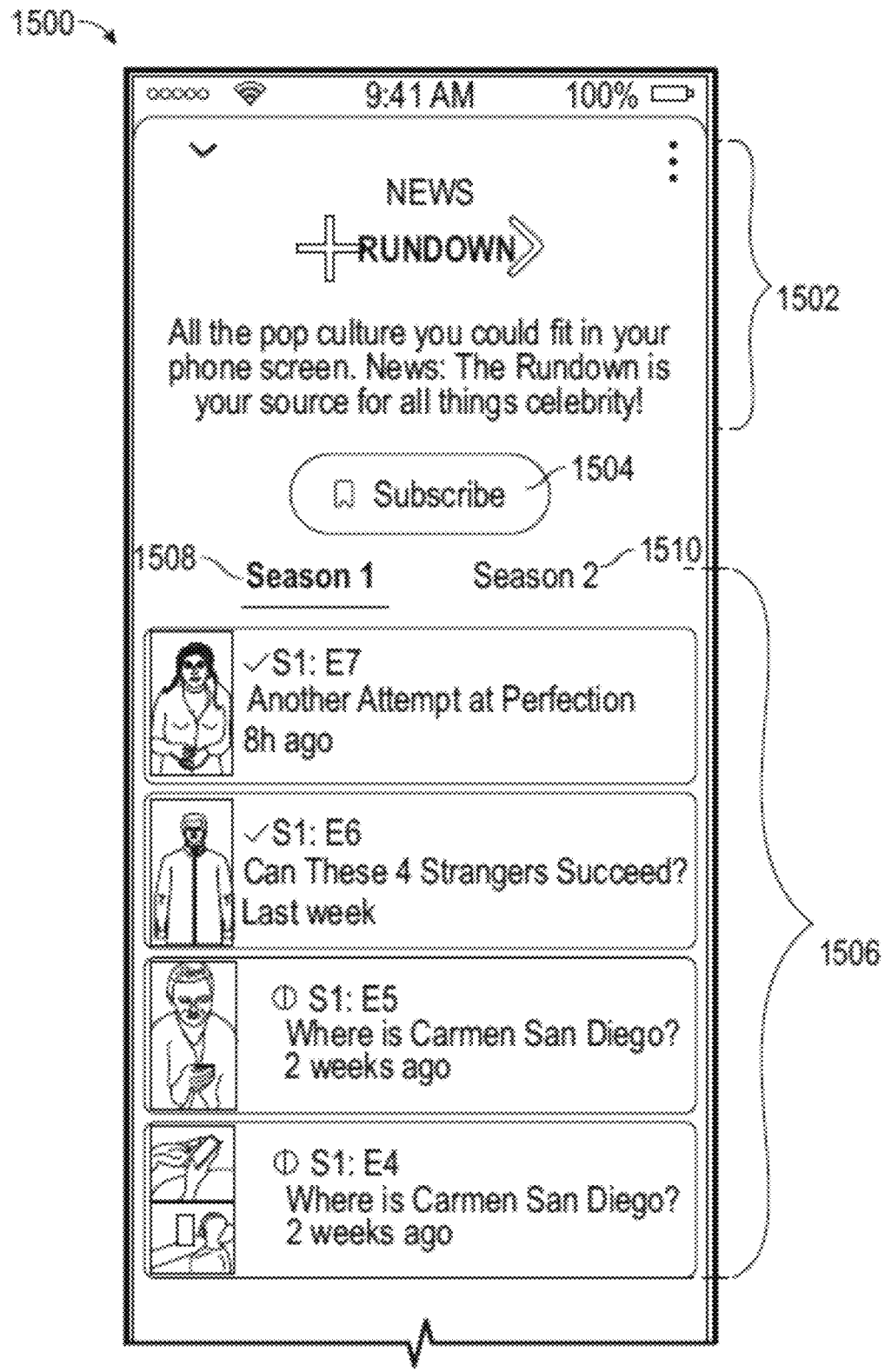

FIG. 15 shows an example publisher profile 1500 comprising identity information 1502 for the publisher (e.g., publisher name and summary of type of content provided) and an option to subscribe 1504 to the publisher content. If a user is already subscribed to the publisher content, the option to subscribe 1504 would not be displayed. The publisher profile 1500 may further comprise images 1506 representing content (e.g., episodes) provided by the publishers, and options to view different seasons of episodes 1508 and 1510.

In one example, a user may subscribe or unsubscribe from a publisher; access highlights, archives, saved content, and different seasons or episodes, and the like from a publisher; send a publisher profile to another user; share a publisher URL, and so forth.

Similar to what is described above for a user profile, a user may request access to a publisher profile and the computing device may request the publisher profile data from the server system, receive the publisher profile data, and display the publisher profile data on a display of the computing device.

Figure 16:
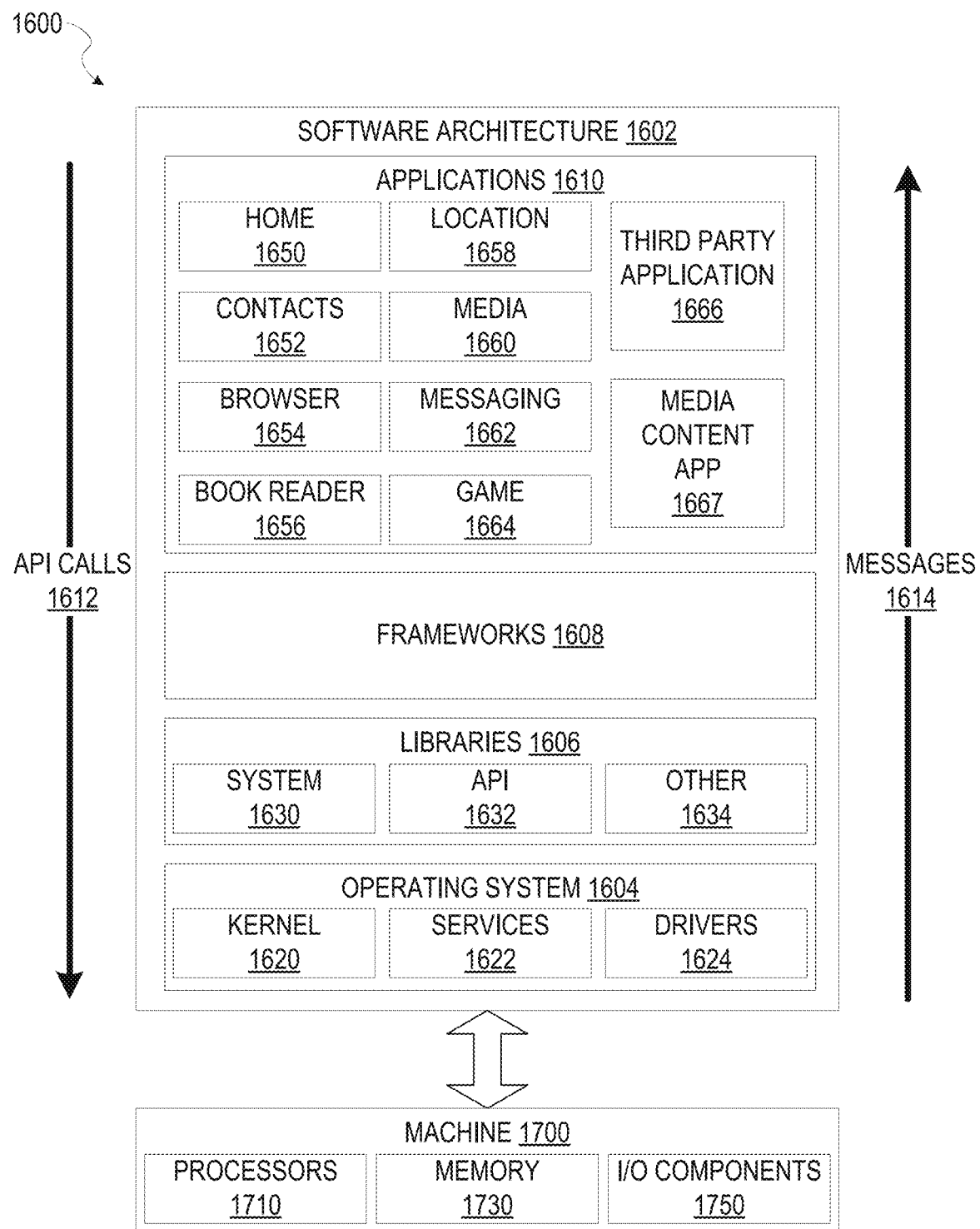
FIG. 16 is a block diagram illustrating an example of a software architecture that may be installed on a machine, according to some example embodiments.

FIG. 16 is a block diagram 1600 illustrating a software architecture 1602, which can be installed on any one or more of the devices described above. For example, in various embodiments, client devices 110, server systems 108, and servers 102, 112, 116, 118, 122, 124 and 128 may be implemented using some or all of the elements of the software architecture 1602. FIG. 16 is merely a non-limiting example of a software architecture, and it will be appreciated that many other architectures can be implemented to facilitate the functionality described herein. In various embodiments, the software architecture 1602 is implemented by hardware such as machine 1700 of FIG. 17 that includes processors 1710, memory 1730, and I/O components 1750. In this example, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third-party application 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

Some embodiments may particularly include a media content application 1667. In certain embodiments, this may be a standalone application that operates to manage communications with a server system such as third-party servers or the server system 108. In other embodiments, this functionality may be integrated with another application (e.g., messaging application 1662). The media content application 1667 may request and display various data related to messaging, media content, media collections, media overlays, user profiles, publisher profiles, and so forth, and may provide the capability for a user to input data related to the system via a touch interface, via a keyboard, or using a camera device of the machine 1700, communication with a server system via I/O components 1750, and receipt and storage of object data in memory 1730. Presentation of information and user inputs associated with the information may be managed by the media content application 1667 using different frameworks 1608, library 1606 elements, or operating system 1604 elements operating on the machine 1700.

Figure 17:
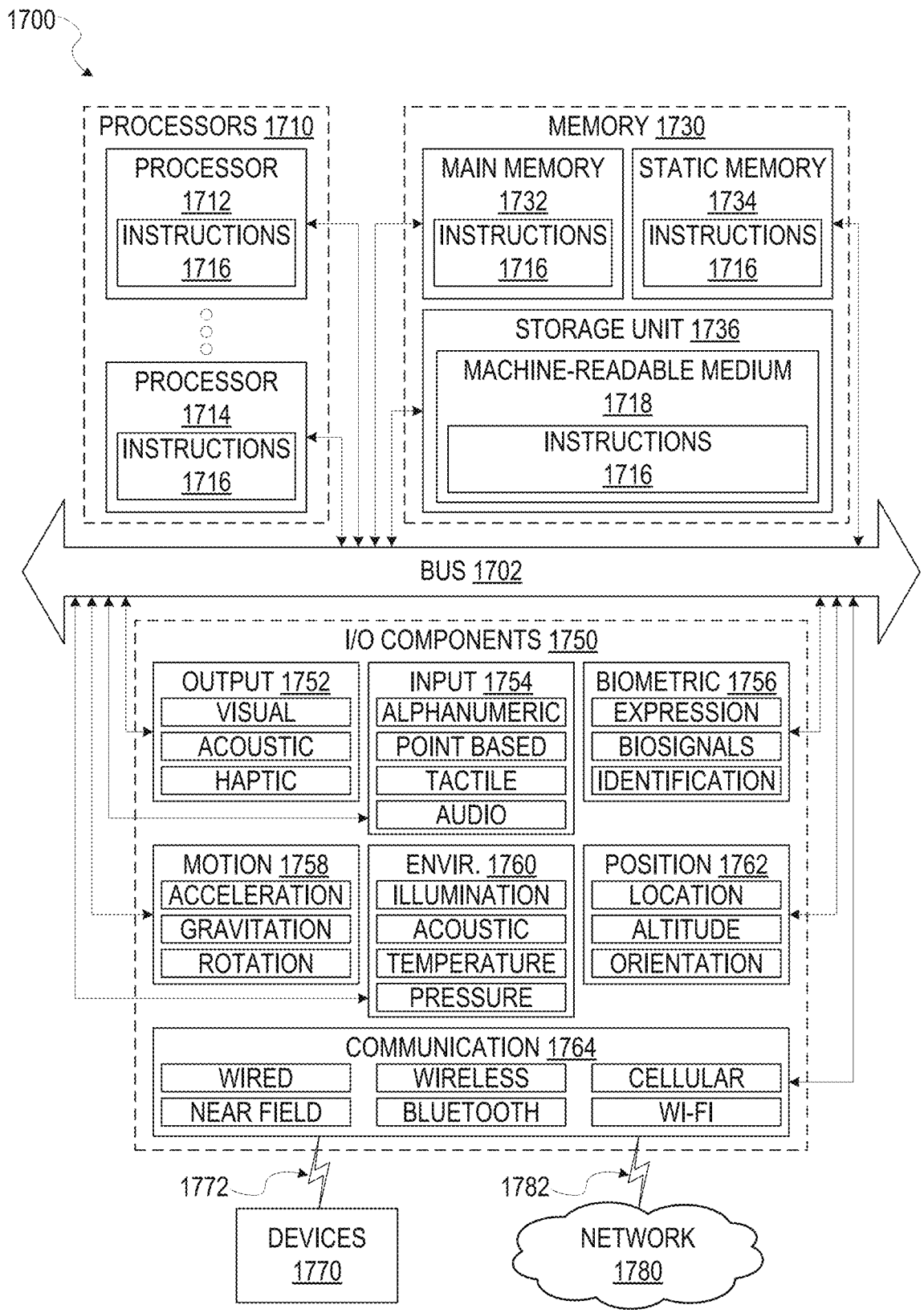
FIG. 17 illustrates a diagrammatic representation of a machine, in the form of a computer system, within which a set of instructions may be executed for causing the machine to perform any one or more of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein can be executed. In alternative embodiments, the machine 1700 operates as a standalone device or can be coupled (e.g., networked) to other machines. In a networked deployment, the machine 1700 may operate in the capacity of a server machine, 108, 112, 116, 118, 122, 124, 128 and the like, or a client device 110 in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1712 and a processor 1714 that may execute the instructions 1716. The term "processor" is intended to include multi-core processors 1710 that may comprise two or more independent processors 1712, 1714 (also referred to as "cores") that can execute instructions 1716 contemporaneously. Although FIG. 17 shows multiple processors 1710, the machine 1700 may include a single processor 1710 with a single core, a single processor 1710 with multiple cores (e.g., a multi-core processor 1710), multiple processors 1712, 1714 with a single core, multiple processors 1712, 1714 with multiple cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1718 on which are stored the instructions 1716 embodying any one or more of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1718.

As used herein, the term "memory" refers to a machine-readable medium 1718 able to store data temporarily or permanently and may be taken to include, but not be limited to, random-access memory (RAM), read-only memory (ROM), buffer memory, flash memory, and cache memory. While the machine-readable medium 1718 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1770 may be another machine 1700 or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1718 is non-transitory (in other words, not having any transitory signals) in that it does not embody a propagating signal. However, labeling the machine-readable medium 1718 "non-transitory" should not be construed to mean that the medium is incapable of movement; the machine-readable medium 1718 should be considered as being transportable from one physical location to another. Additionally, since the machine-readable medium 1718 is tangible, the machine-readable medium 1718 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by a server system from a computing device associated with a first user of a content sharing platform, a request to access a second user profile associated with a second user in the content sharing platform;
determining, by the server system, common activity data to both the first user and the second user that comprises a message comprising a photograph or video generated by the second user that was viewed and saved by the first user; and
causing display, on the first computing device by the server system, of the second user profile comprising the common activity data related to both the first user and the second user in the content sharing platform that comprises the message comprising the photograph or video generated by the second user that was viewed and saved by the first user.

2. The method of claim 1, wherein before receiving the request to access the second user profile associated with the second user, the method comprises:
receiving a request to create a relationship between the first user of the content sharing platform and the second user of the content sharing platform; and
associating the first user with the second user.

3. The method of claim 2, wherein before generating the second user profile, the method comprises:
determining that the first user is associated with the second user.

4. The method of claim 1, wherein the generated second user profile data further comprises information associated with the second user and activity of the second user in the content sharing platform; and
wherein causing display of the second user profile further comprises causing display of the second user profile comprising the information associated with the second user and the activity of the second user in the content sharing platform.

5. The method of claim 1, further comprising:
generating compatibility data for the first user and the second user; and
wherein generating the second user profile data further comprises including the compatibility data in the second user profile data.

6. The method of claim 1, further comprising:
generating one or more relationship type for the first user and the second user; and
wherein generating the second user profile data further comprises including the one or more relationship types in the second user profile data.

7. The method of claim 1, further comprising:
determining creative tools accessible to both the first user and the second user; and
wherein generating the second user profile data further comprises including an indication of the creative tools accessible to both the first user and the second user in the second user profile data.

8. The method of claim 1, wherein the photograph or video was generated by the computing device associated with the second user and posted to a media collection via the content sharing platform, and the photograph or video was viewed or saved by the first user via the computing device associated with the first user.

9. The method of claim 1, wherein the common activity data further comprises data saved by the first user from a communication received from the second user, the data comprising at least one of a phone number, an address, a link, or an attachment.

10. The method of claim 1, wherein the common activity further comprises a song shared between the first user and the second user.

11. A system comprising:
one or more hardware processors; and
a computer-readable medium storing instructions that are executable by the one or more hardware processors to cause the system to perform operations comprising:
receiving, from a computing device associated with a first user of a content sharing platform, a request to access a second user profile associated with a second user in the content sharing platform;
determining common activity data to both the first user and the second user that comprises a message comprising a photograph or video generated by the second user that was viewed and saved by the first user; and
causing display, on the first computing device, of the second user profile comprising the common activity data related to both the first user and the second user in the content sharing platform that comprises the message comprising the photograph or video generated by the second user that was viewed and saved by the first user.

12. The system of claim 11, wherein before receiving the request to access the second user profile associated with the second user, the operations comprise:
receiving a request to create a relationship between the first user of the content sharing platform and the second user of the content sharing platform; and
associating the first user with the second user.

13. The system of claim 12, wherein before generating the second user profile, the operations comprise:
determining that the first user is associated with the second user.

14. The system of claim 11, wherein the generated second user profile data further comprises information associated with the second user and activity of the second user in the content sharing platform; and
wherein causing display of the second user profile further comprises causing display of the second user profile comprising the information associated with the second user and the activity of the second user in the content sharing platform.

15. The system of claim 11, the operations further comprising:
generating compatibility data for the first user and the second user; and
wherein generating the second user profile data further comprises including the compatibility data in the second user profile data.

16. The system of claim 11, the operations further comprising:
generating one or more relationship type for the first user and the second user; and
wherein generating the second user profile data further comprises including the one or more relationship types in the second user profile data.

17. The system of claim 11, the operations further comprising:
   determining creative tools accessible to both the first user and the second user; and
   wherein generating the second user profile data further comprises including an indication of the creative tools accessible to both the first user and the second user in the second user profile data.

18. The system of claim 11, wherein the photograph or video was generated by the computing device associated with the second user and posted to a media collection via the content sharing platform, and the photograph or video was viewed or saved by the first user via the computing device associated with the first user.

19. The system of claim 11, wherein the common activity data further comprises a song shared between the first user and the second user or data saved by the first user from a communication received from the second user, the data comprising at least one of a phone number, an address, a link, or an attachment.

20. A non-transitory computer-readable medium comprising instructions stored thereon that are executable by at least one processor to cause a computing device to perform operations comprising:
   receiving, from a computing device associated with a first user of a content sharing platform, a request to access a second user profile associated with a second user in the content sharing platform;
   determining common activity data to both the first user and the second user that comprises a message comprising a photograph or video generated by the second user that was viewed and saved by the first user; and
   causing display, on the first computing device, of the second user profile comprising the common activity data related to both the first user and the second user in the content sharing platform that comprises the message comprising the photograph or video generated by the second user that was viewed and saved by the first user.

* * * * *